(12) United States Patent
Malhotra et al.

(10) Patent No.: US 6,306,203 B1
(45) Date of Patent: Oct. 23, 2001

(54) PHASE CHANGE INKS

(75) Inventors: Shadi L. Malhotra; Raymond W. Wong; Marcel P. Breton, all of Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/649,760

(22) Filed: Aug. 28, 2000

Related U.S. Application Data

(63) Continuation-in-part of application No. 09/401,250, filed on Sep. 23, 1999.

(51) Int. Cl.[7] .................................................. C09D 11/00
(52) U.S. Cl. ................................. 106/31.29; 106/31.61; 106/31.86; 106/31.58; 106/31.43; 106/31.75
(58) Field of Search ........................... 106/31.29, 31.61, 106/31.86, 31.58, 31.43, 31.75

(56) References Cited

U.S. PATENT DOCUMENTS

| | | | |
|---|---|---|---|
| 4,745,419 | 5/1988 | Quate et al. ................. 346/140 R |
| 4,751,528 | 6/1988 | Spehrley, Jr. et al. .......... 346/140 R |
| 4,791,439 | 12/1988 | Guiles ........................... 346/140 R |
| 4,853,036 | 8/1989 | Koike et al. ...................... 106/20 |
| 4,931,095 | 6/1990 | Nowak et al. .................... 106/22 |
| 5,006,170 | 4/1991 | Schwarz et al. .................. 106/20 |
| 5,041,161 | 8/1991 | Cooke et al. ..................... 106/22 |
| 5,053,079 | 10/1991 | Haxell et al. ..................... 106/31 |
| 5,111,220 | 5/1992 | Hadimoglu et al. .......... 346/140 R |
| 5,121,141 | 6/1992 | Hadimoglu et al. .......... 346/140 R |
| 5,122,187 | 6/1992 | Schwarz et al. .................. 106/25 |
| 5,124,718 | 6/1992 | Koike et al. ...................... 346/1.1 |
| 5,134,189 | 7/1992 | Matsushita et al. .............. 524/549 |
| 5,185,035 | 2/1993 | Brown et al. .................... 106/31 R |
| 5,270,730 | 12/1993 | Yaegashi et al. ................. 346/1.1 |
| 5,279,655 | 1/1994 | Takazawa et al. ............... 106/22 D |
| 5,286,288 | 2/1994 | Tobias et al. .................... 106/20 B |
| 5,354,368 | 10/1994 | Larson, Jr. ...................... 106/22 |
| 5,371,531 | 12/1994 | Rezanka et al. .................. 347/43 |
| 5,378,574 | 1/1995 | Winnik et al. ................... 430/115 |
| 5,389,133 | 2/1995 | Gundlach et al. ............... 106/22 H |
| 5,397,388 | 3/1995 | Fujioka ............................ 106/28 A |
| 5,541,627 | 7/1996 | Quate .............................. 347/10 |
| 5,607,501 | 3/1997 | Fujioka ............................ 106/22 A |
| 5,621,447 | 4/1997 | Takizawa et al. ................ 347/88 |
| 5,662,736 | 9/1997 | Sakai et al. ...................... 106/31.29 |
| 5,688,312 | 11/1997 | Sacripante et al. .............. 106/31.49 |
| 5,700,316 | 12/1997 | Pontes et al. .................... 106/31.58 |
| 5,747,554 | 5/1998 | Sacripante et al. .............. 523/161 |
| 5,844,020 | 12/1998 | Paine et al. ...................... 523/161 |
| 5,876,492 | 3/1999 | Malhotra et al. ................ 106/31.58 |
| 5,902,390 | 5/1999 | Malhotra et al. ................ 106/31.58 |
| 5,922,117 | 7/1999 | Malhotra et al. ................ 106/31.58 |
| 5,931,995 | 8/1999 | Malhotra et al. ................ 106/31.58 |
| 5,952,402 | 9/1999 | Paine et al. ...................... 523/161 |
| 5,954,866 | 9/1999 | Ohta et al. ....................... 106/31.89 |
| 5,958,119 | 9/1999 | Malhotra et al. ................ 106/31.43 |
| 5,989,325 | * 11/1999 | Sacripante et al. .............. 106/31.27 |
| 6,022,910 | 2/2000 | Nishizaki et al. ................ 523/161 |
| 6,045,607 | 4/2000 | Breton et al. .................... 106/31.29 |
| 6,059,871 | * 5/2000 | Boils et al. ....................... 106/31.57 |
| 6,066,200 | 5/2000 | Breton et al. .................... 106/31.43 |
| 6,071,333 | 6/2000 | Breton et al. .................... 106/31.43 |
| 6,096,125 | * 8/2000 | Breton et al. .................... 106/31.43 |
| 6,187,083 | * 2/2001 | Malhotra et al. ................ 106/31.29 |

FOREIGN PATENT DOCUMENTS 6 228 476   8/1994   (JP) .

* cited by examiner

*Primary Examiner*—C. Melissa Koslow
*Assistant Examiner*—Veronica F. Faison
(74) *Attorney, Agent, or Firm*—Judith L. Byorick

(57) ABSTRACT

Disclosed is a phase change ink composition comprising (a) a nonpolymeric ester compound ink vehicle having a melting point of at least about 60° C.; (b) a conductivity enhancing agent; (c) a colorant; (d) an optional antioxidant, and (e) an optional UV absorber.

19 Claims, No Drawings

PHASE CHANGE INKS

This application is a continuation-in-part of U.S. Ser. No. 09/401,250, filed Sep. 23, 1999, the disclosure of which is totally incorporated herein by reference.

Copending application U.S. Ser. No. 09/401,250, filed Sep. 23, 1999, entitled "Hot Melt Inks Containing Polyesters," with the named inventor Shadi L. Malhotra, the disclosure of which is totally incorporated herein by reference, discloses an ink composition comprising (a) a polyester ink vehicle, (b) a nonpolymeric ester viscosity modifier, (c) a colorant, (d) an optional colorant dispersing agent, (e) an optional conductivity enhancing agent, (f) an optional antioxidant, and (g) an optional UV absorber.

U.S. Pat. No. 6,132,499 entitled "Inks," filed Jul. 29, 1999, with the named inventors Raymond W. Wong, Marcel P. Breton, Danielle C. Boils, Fatima M. Mayer, and Shadi L. Malhotra, the disclosure of which is totally incorporated herein by reference, discloses an ink composition comprising (1) a carbamate or thiourea with a melting point of from about 60° C. to about 120° C. and an acoustic loss value of from about 25 to about 80 decibels per millimeter, (2) an alcohol compound with a melting point of about 25° C. to about 90° C. and with an acoustic loss value of from about 5 to about 40 decibels per millimeter, (3) a lightfastness component, (4) an antioxidant, and (5) a colorant.

U.S. Pat. No. 6,110,265, filed Apr. 27, 1999, entitled "Ink Compositions," with the named inventors Marcel P. Breton, Shadi L. Malhotra, Raymond W. Wong, Danielle C. Boils, Carl P. Tripp, and Pudupadi R. Sundararajan, the disclosure of which is totally incorporated herein by reference, discloses an ink composition comprising (1) a solid oxazoline compound with a melting point of from about 60° C. to about 120° C. and an acoustic loss value of from about 25 to about 80 dB/mm; (2) a carbamate compound with a melting point of from about 25° C. to about 100° C.; (3) an alcohol compound; (4) a lightfastness component; (5) a lightfastness antioxidant; and (6) a colorant.

U.S. Pat. No. 6,096,124, filed Apr. 27, 1999, entitled "Ink Compositions," with the named inventors Raymond W. Wong, Shadi L. Malhotra, and Marcel P. Breton, the disclosure of which is totally incorporated herein by reference, discloses a conductive ink composition comprising (1) an acid salt; (2) a conductive quaternary compound; (3) a viscosity modifying compound; (4) a lightfastness component; (5) a lightfastness antioxidant; and (6) a colorant.

U.S. Pat. No. 6,086,661, filed Apr. 27, 1999, entitled "Ink Compositions," with the named inventors Shadi L. Malhotra, James D. Mayo, and Marcel P. Breton, the disclosure of which is totally incorporated herein by reference, discloses an aqueous ink composition comprising (1) a quaternary compound selected from the group consisting of (a) imidazolinium quaternary salts, (b) phosphonium quaternary salts, and (c) an ammonium quaternary salt; (2) a liquid ink vehicle; (3) a paper-curl reducing compound; (4) a lightfastness component; (5) a lightfastness antioxidant, (6) a substantially water soluble organic salt or a substantially water soluble inorganic salt; (7) a biocide; and (8) a colorant.

U.S. Pat. No. 6,096,125, filed Apr. 27, 1999, entitled "Ink Compositions" with the named inventors Marcel P. Breton; Shadi L. Malhotra, Danielle C. Boils, Raymond W. Wong, Guerino G. Sacripante, and John M. Lennon, the disclosure of which is totally incorporated herein by reference, discloses an ink composition comprising (1) a mixture comprising a salt and an oxyalkylene compound wherein the conductive mixture possesses a melting point of from about 60° C. to about 120° C.; (2) an ink vehicle compound with a melting point of from about 80° C. to about 100° C.; (3) a viscosity modifying amide compound; (4) a lightfastness component; (5) a lightfastness antioxidant; and (6) a colorant.

U.S. Pat. No. 6,106,599, filed Jun. 29, 1999, entitled "Inks," with the named inventors Marcel P. Breton, Shadi L. Malhotra, and Raymond W. Wong, the disclosure of which is totally incorporated herein by reference, discloses an ink composition comprising (1) an azole compound, (2) a viscosity compound, (3) a lightfastness component, (4) an antioxidant, and (5) a colorant, Copending Application U.S. Ser. No. 09/342,947, entitled "Ink Compositions," filed Jun. 29, 1999, with the named inventors Marcel P. Breton, Shadi L. Malhotra, and Gregory J. Kovacs, the disclosure of which is totally incorporated herein by reference, discloses an ink composition comprising (1) a polymer; (2) an acid compound of the formula $CH_3(CH_2)_m(CH_2CH=CH)_p(CH_2)_n COOH$ wherein n, m, and p represent the number of segments: (3) a conductive component; (4) a lightfastness component; and (5) a colorant.

U.S. Pat. No. 6,106,601, filed Apr. 27, 1999, entitled "Ink Compositions," with the named inventors Shadi L. Malhotra, Raymond W. Wong, and Marcel P. Breton, the disclosure of which is totally incorporated herein by reference, discloses an ink composition comprising (1) an oxazoline compound; (2) a thiourea compound with an optional melting point of from about 25 to about 100° C., and with an optional acoustic loss value of from about 5 to about 40 dB/mm; (3) an alcohol; (4) a lightfastness compound; (5) an antioxidant; and (6) a colorant.

U.S. Pat. No. 6,176,909, filed Sep. 23, 1999, entitled "Conductive Inks Containing Pyridine Compounds," with the named inventors Shadi L. Malhotra, Raymond W. Wong, and Marcel P. Breton, the disclosure of which is totally incorporated herein by reference, discloses an ink composition comprising (a) an ink vehicle which comprises a conductive pyridinium compound having a melting point of no lower than about 60° C. and no higher than about 155° C., (b) a viscosity modifier which is a pyridine compound, a pyrimidine compound, a pyrazine compound, a pyridazine compound, or mixtures thereof, said pyridine, pyrimidine, pyrazine, or pyridazine compounds having a melting point of no lower than about 60° C. and no higher than about 155° C., (c) a binder which is a polymeric pyridine or pyridinium compound: (d) a colorant, (e) an optional antioxidant, and (f) an optional UV absorber.

U.S. Pat. No. 6,187,083, filed Sep. 23, 1999, entitled "Conductive Inks Containing Sulfonate Salts," with the named inventors Shadi L. Malhotra, Raymond W. Wong, and Marcel P. Breton, the disclosure of which is totally incorporated herein by reference, discloses an ink composition comprising (a) an ink vehicle which is selected from (i) 1,3-dialkyl ureas, (ii) N,N'-ethylene bisalkylamides, (iii) N-(4-chloro-3-(4,5-dihydro-5-oxo-1-(2,4,6-trichlorophenyl)-1H-pyrazol-3-yl amino)phenyl)-2-(1-octadecenyl)succinimide, (iv) 1,3-diamino-5,6-bis (octyloxy)isoindoline, (v) N,N-dimethyl alkylamine N-oxides, (vi) alkyl amides, or (vii) mixtures thereof, said ink vehicle having a melting point of no lower than about 60° C. and no higher than about 155° C., (b) a viscosity modifier which is an amide having a melting point of no lower than about 60° C. and no higher than about 155° C., (c) a conductive sulfonate salt having a melting point of no lower than about 60° C. and no higher than about 155° C., (d) a colorant, (e) an optional antioxidant, and (f) an optional ultraviolet absorber.

U.S. Pat. No. 6,113,678, filed Sep. 23, 1999, entitled "Hot Melt Inks Containing Polyanhydrides," with the named inventor Shadi L. Malhotra, the disclosure of which is totally incorporated herein by reference, discloses an ink composition comprising (a) a polyanhydride ink vehicle, (b) a nonpolymeric anhydride viscosity modifier, and (c) a colorant.

Copending application U.S. Ser. No. 09/404,570, filed Sep. 23, 1999, entitled "Hot Melt Inks Containing Aldehyde Copolymers," with the named inventor Shadi L. Malhotra, the disclosure of which is totally incorporated herein by reference, discloses an ink composition comprising (a) an aldehyde copolymer ink vehicle, (b) a nonpolymeric aldehyde viscosity modifier, (c) a colorant, (d) an optional conductivity enhancing agent, (e) an optional antioxidant, and (f) an optional UV absorber.

Copending application U.S. Ser. No. 09/401,740, filed Sep. 23, 1999, entitled "Hot Melt Inks Containing Styrene or Terpene Polymers," with the named inventor Shadi L. Malhotra, the disclosure of which is totally incorporated herein by reference, discloses an ink composition comprising (a) a styrene polymer or terpene polymer hardening component, (b) a nonpolymeric aromatic viscosity modifier, (c) a colorant, (d) an optional nonpolymeric aromatic ink vehicle, (e) an optional colorant dispersing agent, (f) an optional conductivity enhancing agent, (g) an optional antioxidant, and (h) an optional UV absorber.

U.S. Pat. No. 6,117,223, filed Sep. 23, 1999, entitled "Hot Melt Inks Containing Polyketones," with the named inventor Shadi L. Malhotra, the disclosure of which is totally incorporated herein by reference, discloses an ink composition comprising (a) a nonpolymeric ketone ink vehicle having a melting point of at least about 60° C., (b) a polyketone hardening component, (c) a colorant, (d) a conductivity enhancing agent, (e) an optional antioxidant, (f) an optional viscosity modifier which is a nonpolymeric carbonate, monoketone, or diketone, and (g) an optional ultraviolet absorber.

BACKGROUND OF THE INVENTION

The present invention is directed to phase change (hot melt) ink compositions. More specifically, the present invention is directed to phase change ink compositions suitable for use in ink jet printing processes, including piezoelectric ink jet printing processes, acoustic ink jet printing processes, and the like. One embodiment of the present invention is directed to a phase change ink composition comprising (a) a nonpolymeric ester compound ink vehicle having a melting point of at least about 60° C.; (b) a conductivity enhancing agent; (c) a colorant; (d) an optional antioxidant, and (e) an optional UV absorber.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin,* Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate such that the resulting image exhibits a hardness value of from about 0.1 to about 0.5 millimeter (measured with a penetrometer according to the ASTM penetration method D1321).

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In hot melt ink jet printing processes employing these phase change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase change ink is applied to the substrate, freezing on the substrate resolidifies the ink. When the printer employs a piezoelectric hot melt ink jet printing process, a plurality of ink jet nozzles is provided in a printhead. A piezoelectric vibrating element is located in each ink channel upstream from a nozzle so that the piezoelectric oscillations propel ink through the nozzle. After the phase change ink is applied to the substrate, freezing on the substrate resolidifies the ink.

In phase change printing processes, the ink preferably undergoes a change with temperature from a solid state to a liquid state in a desirably short period of time, typically in less than about 100 milliseconds. One advantage of phase change inks is their ability to print superior images on plain paper, since the phase change ink quickly solidifies as it cools, and, since it is primarily waxy in nature, it does not normally soak into a paper medium.

Phase change inks also preferably exhibit a high degree of transparency, generally measured in terms of haze value of the ink. Transparent, low haze inks exhibit high gloss and high optical density compared to opaque inks, although both may appear to be evenly colored.

The use of phase change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also be attracted by an electric field.

Phase change inks used in acoustic ink printing processes also preferably exhibit a low acoustic loss value, typically below about 100 decibels per millimeter. In addition, the ink vehicle preferably can fill the pores of a porous substrate, such as paper, and preferably has a melting point of from about 80 to about 120° C.; this melting point, along with low acoustic loss, enables a minimization of energy consumption. When the phase change inks are used in an electric field assisted acoustic ink printing process, the inks also are sufficiently conductive to permit the transmission of electrical signals generated by the electric field assisted acoustic ink jet printer; the inks preferably exhibit a conductivity of from about 2 to about 9 log(picomho/cm) (measured under melt conditions at about 150° C. by placing an aluminum electrode in the molten ink and reading the resistivity output on a GenRad 1689 precision RLC Digibridge at a frequency of 1 kilohertz). In general, the conductivity of a material can be measured in terms of the reciprocal of resistivity, which is the capacity for electrical resistance. Further information regarding electric field assisted acoustic ink printing processes is disclosed in, for example, Copending Application U.S. Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference, which discloses a method of forming and moving ink drops across a gap between a printhead and a print medium or intermediate print medium in a marking device. The method includes generating an electric field, forming the ink drops adjacent to the printhead, and controlling the electric field. The electric field is generated to extend across the gap. The ink drops are formed in an area adjacent to the printhead. The electric field is controlled such that an electrical attraction force exerted on the formed ink drops by the electric field is the greatest force acting on the ink drops. The marking device can be incorporated into a transfuse printing system having an intermediate print medium made of one or more materials that allow for lateral dissipation of electrical charge from the incident ink drops.

U.S. Pat. No. 4,751,528 (Spehrley, Jr. et al.), the disclosure of which is totally incorporated herein by reference, discloses a hot melt ink jet system including a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

U.S. Pat. No. 4,791,439 (Guiles), the disclosure of which is totally incorporated herein by reference, discloses an ink jet apparatus for use with hot melt ink having an integrally connected ink jet head and reservoir system, the reservoir system including a highly efficient heat conducting plate, such as aluminum, inserted within an essentially non-heat conducting reservoir housing. The reservoir system has a sloping flow path between an inlet position and a sump from which ink is drawn to the head, and includes a plurality of vanes situated upon the plate for rapid heat transfer.

U.S. Pat. No. 4,853,036 (Koike et al.) and U.S. Pat. No. 5,124,718 (Koike et al.), the disclosures of each of which are totally incorporated herein by reference, disclose an ink for ink-jet recording which comprises a liquid composition essentially comprised of a coloring matter, a volatile solvent having a vapor pressure of 1 mmHg or more at 25° C., and a material being solid at room temperature and having a molecular weight of 300 or more; and prepared so as to satisfy formula $B_1/A_1 \geq 3$, assuming viscosity as $A_1$ cP at 25° C. measured when the content of the solid material in said composition is 10 percent by weight, and assuming viscosity as $B_1$ cP at 25° C. measured when the content of the solid material in said composition is 30 percent by weight. An ink-jet recording process employing the above mentioned ink is also provided.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamindes; phosphites; phosphonates; phosphates; alkyl sulfines; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,041,161 (Cooke et al.), the disclosure of which is totally incorporated herein by reference, discloses an ink jet ink which is semi-solid at room temperature. The subject ink combines the advantageous properties of thermal phase change inks and liquid inks. More particularly, the inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of above 45° C. to about 110° C., at which temperature the ink has a viscosity of about 10 to 15 centipoise. The subject inks exhibit controlled penetration and spreading, but do not remain on the surface of most substrates where they would be prone to burnishing, cracking or flaking. These inks further comprise 0.1 to 30 weight percent of a colorant system.

U.S. Pat. No. 5,111,220 (Hadimoglu et al.), the disclosure of which is totally incorporated herein by reference, discloses a method of fabricating an acoustic ink printhead with an integrated liquid level control layer. With standard photolithographic techniques, acoustic lenses and ink supply channels are defined in a substrate. Apertures are created in a spacer layer plate to define cavities to hold the ink reservoirs for each ejector. Corresponding alignment holes are also made in the substrate and in the spacer layer plate. With spheres matching the size of the alignment holes, the spheres engage the alignment holes to precisely align the apertures in the spacer layer plate with the acoustic lenses in the substrate. The plate and substrate are then bonded for an integrated acoustic printhead with liquid level control by capillary action.

U.S. Pat. No. 5,121,141 (Hadimoglu et al.), the disclosure of which is totally incorporated herein by reference, discloses an acoustic ink printhead with an integrated liquid level control layer. A spacer layer is fixed to a substrate. Apertures are created in the spacer layer, which is then used as a mask, to define acoustic lenses and ink supply channels in the substrate. The apertures in the spacer layer used to define self-aligned acoustic lenses and to form the cavities to hold the ink reservoirs for each ejector. The thickness of the spacer layer is set so that acoustic waves from the acoustic lens below are focused at the free surface of the ink which maintains its level at the top of the spacer layer by capillary action.

U.S. Pat. No. 5,371,531 (Rezanka et al.), the disclosure of which is totally incorporated herein by reference, discloses a multi-color ink-jet printer in which a first partial image is created on a recording medium, and then a second partial image is created on the same recording medium after the first partial image is substantially dried. The first partial image comprises an ink which dries at a slower rate than that of the second partial image. In one embodiment, means are provided for heating the recording medium prior to the creation of the second partial image.

U.S. Pat. No. 5,688,312 (Sacripante et al.), the disclosure of which is totally incorporated herein by reference, discloses an ink composition comprising a colorant and an imide or bisimide with a viscosity of from about 1 centipoise to about 10 centipoise at a temperature of from about 125° C. to about 180° C., and which imide or bisimide is of the Formulas I or II, respectively:

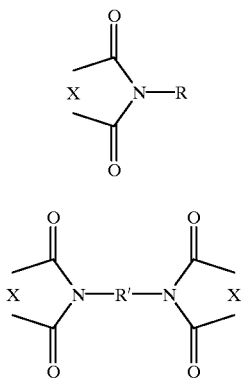

wherein R is a hydrocarbon of from about 2 to about 50 carbon atoms; R' is an alkylene hydrocarbon or a polyalkyleneoxide, each with from about 2 to about 30 carbon atoms; and X is an arylene of from 6 to about 24 carbon atoms, or an alkylene of from about 2 to about 10 carbon atoms.

U.S. Pat. No. 5,700,316 (Pontes et al.), the disclosure of which is totally incorporated herein by reference, discloses an ink composition comprising a colorant and a vehicle of a poly(alkylene oxide)-alkylate (I), a poly(alkylene oxide)-dialkylate (II), a polyoxa-alkanoate ester (III), or a polyoxa-alkanedioate diester (IV), and which ink possesses a viscosity of from about 1 centipoise to about 15 centipoise at a temperature of from about 125° C. to about 165° C., and which vehicle is of the formulas

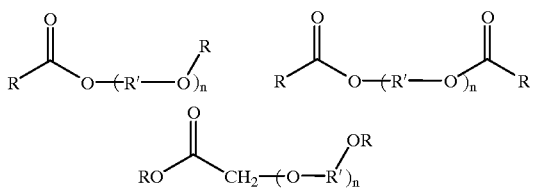

-continued

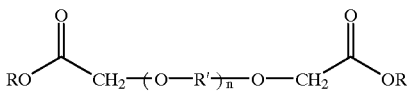

wherein R is alkyl, R' is an alkylene, or arylene, and n is an integer of from about 2 to about 20.

U.S. Pat. No. 5,747,554 (Sacripante et al.), the disclosure of which is totally incorporated herein by reference, discloses an ink composition comprising a polyesterified-dye (I) or polyurethane-dye (II) with a viscosity of from about 3 centipoise to about 20 centipoise at a temperature of from about 125° C. to about 165° C. and represented by the formulas

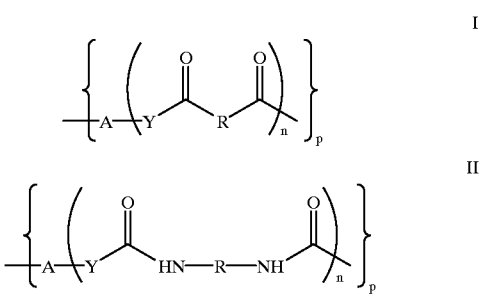

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

U.S. Pat. No. 5,844,020 (Paine et al.) and U.S. Pat. No. 5,952,402 (Paine et al.), the disclosures of each of which are totally incorporated herein by reference, disclose an ink composition comprising a colorant and a phase change vehicle derived from the reaction product of a resin containing at least one furan moiety and at least one maleimide moiety, and wherein said ink possesses a viscosity of from about 1 centipoise to about 20 centipoise at a temperature of from about 100° C. to about 180° C.

U.S. Pat. No. 5,902,390 (Malhotra et al.), the disclosure of which is totally incorporated herein by reference, discloses an ink comprising (1) a liquid ketone, (2) a solid ketone, (3) a lightfastness UV absorber, (4) a lightfastness antioxidant, and (5) a colorant.

U.S. Pat. No. 5,922,117 (Malhotra et al.), the disclosure of which is totally incorporated herein by reference, discloses an ink composition comprising (1) a liquid alcohol vehicle, (2) a solid alcohol compound, (3) a quaternary compound, (4) a lightfastness UV absorber, (5) a lightfastness antioxidant, and (6) a colorant.

U.S. Pat. No. 5,931,995 (Malhotra et al.), the disclosure of which is totally incorporated herein by reference, discloses an ink comprising (1) a liquid aldehyde, a liquid acid, or mixtures thereof, (2) a solid additive aldehyde compound, a solid additive acid compound, or mixtures thereof, (3) a lightfastness UV absorber, (4) a lightfastness antioxidant, and (5) a colorant.

U.S. Pat. No. 5,958,119 (Malhotra et al.), the disclosure of which is totally incorporated herein by reference, discloses an ink composition comprising (1) a liquid cyclic vehicle (2) a cyclic compound, (3) a liquid crystalline nitrile compound, (4) a lightfastness UV absorber, (5) a lightfastness antioxidant, and (6) a colorant.

U.S. Pat. No. 6,045,607 (Breton et al.), the disclosure of which is totally incorporated herein by reference, discloses an ink composition containing (1) a first solid carbamate, (2) a second carbamate with a dissimilar melting point than the first solid carbamate (1), (3) a lightfastness component, (4) a lightfastness antioxidant, and (5) a colorant.

U.S. Pat. No. 6,066,200 (Breton et al.), the disclosure of which is totally incorporated herein by reference, discloses an ink composition comprising (1) a solid urea compound; (2) an alcohol, (3) a lightfastness component; (4) a lightfast antioxidant; and (5) a colorant.

U.S. Pat. No. 6,071,333 (Breton et al.), the disclosure of which is totally incorporated herein by reference, discloses an ink composition containing (1) a solid carbamate compound; (2) an alcohol compound with a melting point of from about 25° C. to about 90° C.; (3) a lightfastness component; (4) a lightfastness antioxidant; and (5) a colorant.

U.S. Pat. No. 5,876,492 (Malhotra et al.), the disclosure of which is totally incorporated herein by reference, discloses an ink comprising (1) a liquid ester vehicle, (2) a solid ester compound, (3) a liquid crystalline ester compound, (4) a UV absorber, (5) an antioxidant, and (6) a colorant.

U.S. Pat. No. 5,279,655 (Takazawa et al.), the disclosure of which is totally incorporated herein by reference, discloses a printer ink composition containing a triphenylmethane dye or a lake pigment derived therefrom as a coloring agent, including as the coloring agent a triphenylmethane dye having general formula (I):

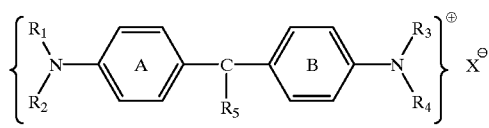

wherein $R_1$, $R_2$, $R_3$, and $R_4$ are independently a hydrogen atom, an alkyl group, an aralkyl group, or an aryl group, $R_5$ is an aryl group, X- is a counter ion, and ring A or ring B may be substituted by one or more substituents, provided that at least one group among $R_1$, $R_2$, $R_3$, and $R_4$ is not methyl and in the case that $R_5$ is p-dimethylaminophenyl, at least one of $R_1$ and $R_2$ and at least one of $R_3$ and $R_4$ are not methyl; or a lake pigment derived therefrom, in order to prevent the formation of Michler's ketone. The ink composition is used for printing media for printer such as fabric ink ribbon, ink roll, ink-retaining element, thermal transfer ink ribbon, and pressure-sensitive transfer ink ribbon.

U.S. Pat. No. 5,662,736 (Sakai et al.), the disclosure of which is totally incorporated herein by reference, discloses a hot melt ink including at least one wax, at least one coloring material, a first resin having a softening point ranging from room temperatures to 100° C., and a second resin having a softening point ranging from 50° C. to 150° C. and higher than the softening point of the first resin. The hot melt ink has an appropriate softening point and high light transmittance while maintaining fixing property and appropriate viscosity by combining a resin with a relatively low molecular weight and a resin with a relatively high molecular weight.

U.S. Pat. No. 5,185,035 (Brown et al.), the disclosure of which is totally incorporated herein by reference, discloses transparent hot melt jet inks including a coloring agent, a vehicle for the coloring agent including a thermoplastic nontransparent base material and a transparentizing agent containing a glycol ester of a $C_{18-35}$ fatty acid, a glyceryl ester of a $C_{18-36}$ fatty acid with metal soaps, a polyethylene wax having a molecular weight of 400 to 1200, a synthetic paraffin wax, or a linear alcohol with a molecular weight of 500 to 1000 or a mixture thereof, a microcrystalline or modified microcrystalline wax.

U.S. Pat. No. 6,022,910 (Nishizaki et al.), the disclosure of which is totally incorporated herein by reference, discloses a hot melt solid ink composition comprising at least one polyamide and at least one terpene resin. The terpene resin is present in an amount of from 0.5 percent by weight to 15 percent by weight based on the total weight of the ink composition. This hot melt solid ink composition can be stable to heat upon recording using ink jet recording apparatus where ink is heated to melt at a temperature higher than ordinary temperature to make a record, and has a superior transparency and a superior adhesion to printing mediums.

U.S. Pat. No. 5,286,288 (Tobias et al.), the disclosure of which is totally incorporated herein by reference, discloses a hot melt ink composition for use in continuous ink jet printing comprising an electrolyte, an electrolyte-solvating and dissociating compound, and an image-forming agent, said ink being solid at about 25° C., said ink liquefying at a temperature between 75° C. and 175° C., and said ink in the liquid stage having a conductivity of greater than about 100 microsiemens/cm.

U.S. Pat. No. 5,378,574 (Winnik et al.), the disclosure of which is totally incorporated herein by reference, discloses ink jet inks and liquid developers which contain colored particles comprising hydrophilic silica particles, to the surfaces of which dyes are covalently bonded through silane coupling agents. The ink jet inks generally comprise a liquid medium and a plurality of the colored silica particles. The liquid developers generally comprise a liquid medium, a resin, a plurality of the colored silica particles, and a charge control agent. The particles are prepared by a process which comprises reacting hydrophilic silica particles with a silane coupling agent in the absence of water to form particles having covalently attached thereto coupling agents, followed by reacting a dye with the coupling agent attached to the silica particles.

U.S. Pat. No. 5,607,501 (Fujioka), the disclosure of which is totally incorporated herein by reference, discloses a hot melt ink utilizable for an ink jet printer, the hot melt ink being prepared by mixing distearyl ketone (91 parts by weight), α-olefin maleic anhydride copolymer (6 parts by weight), and 1,1,3-tris(3-tert-butyl-4-hydroxy-6-methyl)butane (1 part by weight), thereafter by adding C.I. SOLVENT RED 49 (2 parts by weight) to the obtained mixture, and by sufficiently stirring and dissolving C.I. SOLVENT RED 49 in the ink.

U.S. Pat. No. 5,954,866 (Ohta et al.), the disclosure of which is totally incorporated herein by reference, discloses an ink composition for ink jet recording which can meet many property requirements for an ink composition used in ink jet recording and, in addition, can yield a good image on a recording medium having a layer comprising a water soluble resin. An ink jet recording method using the same is also provided. An ink composition comprising a pigment as a colorant, an anionic surfactant having a polyoxyethylene group, a dispersant, and water is used to record an image on a recording medium having a layer comprising a water-soluble resin by ink jet recording.

U.S. Pat. No. 5,134,189 (Matsushita et al.), the disclosure of which is totally incorporated herein by reference, discloses an ink for heat-sensitive recording which comprises, as color developing components, an aromatic or heterocyclic isocyanate compound and an imino compound which are dispersed and/or dissolved in an organic solvent and, as a binder, (1) a copolymer of a mixture of component (a) which is an α,β-ethylenically unsaturated carboxylic acid and component (b) which is at least one monomer selected from the group consisting of acrylic acid esters, methacrylic acid esters and aromatic vinyl compounds and/or (2) a three-component- or more component-copolymer, the fundamental skeleton of which is composed of isobutylene and maleic anhydride. The ink may additionally contain a heat-meltable substance and the like. The ink has a good wettability to a plastic substrate and can be dried rapidly in a printing machine.

U.S. Pat. No. 4,931,095 (Nowak et al.), the disclosure of which is totally incorporated herein by reference, discloses an ink for hot melt ink jet printing comprising a benzoate solvent which is solid at room temperature. This ink is suitable for jetting onto an opaque substrate such as paper for directly readable print, or onto a transparent substrate, such as an acetate or polycarbonate sheet, to make a projectable transparency.

U.S. Pat. No. 5,621,447 (Takizawa et al.), the disclosure of which is totally incorporated herein by reference, discloses a jet recording method wherein a normally solid recording material is placed in a heat-melted state in a path defined by a nozzle leading to an ejection outlet and, in a recording step, is imparted with a thermal energy corresponding to a recording signal to generate a bubble, thus ejecting a droplet of the recording material out of the ejection outlet. As an improvement, in the recording step, the bubble is caused to communicate with ambience, and the droplet is ejected in a diameter d ($\mu$m) and at an average speed v (m/sec) satisfying: $10 \leq d \leq 60$ and $7 \leq v \leq 20$. As a result, the droplet is deposited on a recording medium without pileup or scattering.

U.S. Pat. No. 5,389,133 (Gundlach et al.), the disclosure of which is totally incorporated herein by reference, discloses a process for preparing an aqueous ink composition which comprises adjusting the pH of the ink with phosphorous acid or phosphite salts. Also disclosed are ink compositions prepared by this process. In certain preferred embodiments, the ink compositions can also contain betaine, sulfolane, dimethyl sulfoxide, or N,N'-bis(3-aminopropyl)-1,2-ethylenediamine, as well as mixtures thereof. In other preferred embodiments, the ink composition comprises an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof.

JP 6 228 476, the disclosure of which is totally incorporated herein by reference, discloses a recording liquid obtained by adding a solvent such as isopropyl alcohol, thiodiglycol, or 2-pyrrolidone and ion exchange water to at least one of phthalocyanine, xanthene, triphenylmethane, anthraquinone, monoazo, disazo, trisazo, and tetraazo-based dyes or a pigment, stirring and mixing the resultant mixture, preparing a recording liquid, and further blending the prepared recording liquid with 2-oxazolidone. The recording liquid has good humectant properties, discharge stability, and resistance of a member to the recording liquid and high solubility in dyes without causing a bronze phenomenon in printed letters, and is capable of providing clear images having high image density and useful for ink jet recording.

U.S. Pat. No. 5,270,730 (Yaegashi et al.), the disclosure of which is totally incorporated herein by reference, discloses a normally solid recording material that is heat-melted in a path defined by a nozzle leading to an ejection outlet and is imparted with a thermal energy from a heater corresponding to a recording signal to generate a bubble. As a result, a droplet of the recording material is ejected out of the ejection outlet under the action of the bubble while the bubble is caused to communicate with ambience. The normally solid recording material preferably contains a colorant, a first heat-fusible solid substance having a melting point Tm of 36°–150° C. and a boiling point Tb of 150°–370° C., and a second heat-fusible solid substance having a melting point Tm and a solidifying point Tf satisfying a relationship of Tm−Tf$\leq$30° C. The distance between the heater and the ejection outlet, the sectional size of the nozzle and the thermal energy imparted by the heater are controlled to cause the bubble to communicate with ambience.

U.S. Pat. No. 5,053,079 (Haxell et al.), the disclosure of which is totally incorporated herein by reference, discloses a dispersed, pigmented hot melt ink containing a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle. Preferred is the isocyanate-modified microcrystalline wax marketed as Petrolite WB17.

U.S. Pat. No. 5,397,388 (Fujioka), the disclosure of which is totally incorporated herein by reference, discloses a hot melt ink for an ink jet printer comprising 50 weight percent or more of a solid wax that is solid at normal temperatures and has a solubility parameter of not larger than 9.00, an organic substance having a solubility parameter greater than that of the solid wax, a polymer material that is miscible with at least one of the solid wax and the organic substance and which has a weight average molecular weight of not less than 500, and a coloring material. The hot melt ink exhibits good dispersability and dispersion stability of the coloring material with good heat stability and color fastness to light.

U.S. Pat. No. 5,354,368 (Larson, Jr. et al.), the disclosure of which is totally incorporated herein by reference, discloses a hot melt jet ink composition comprising a tall oil resin having a high acid number that exhibits improved adhesion when printed onto substrates.

While known compositions and processes are suitable for their intended purposes, a need remains for phase change inks that are suitable for hot melt ink jet printing processes, such as hot melt piezoelectric ink jet printing processes and the like. Further, a need remains for phase change inks that are suitable for hot melt acoustic ink jet printing processes. Additionally, a need remains for phase change inks that, upon cooling, form images with desirable hardness values. There is also a need for phase change inks that, upon cooling, form images that are robust and abrasion resistant. In addition, there is a need for phase change inks that form images compatible with a wide variety of print substrates, such as plain papers, coated papers, transparencies, and the like. Further, there is a need for phase change inks that form images of photographic quality, particularly when printed on plain paper. Additionally, there is a need for phase change inks that generate waterfast images. A need also remains for phase change inks that generate lightfast images. In addition, a need remains for phase change inks that generate high quality images on a wide variety of substrates, including plain paper. Further, a need remains for phase change inks that generate fast-drying images. Additionally, a need remains for phase change inks that generate high quality text images. There is also a need for phase change inks that generate high quality graphics images. In addition, there is a need for phase change inks that form images wherein the colorant is retained on the surface of the print substrate while the ink vehicle can continue to spread throughout the substrate. Further, there is a need for phase change inks that generate images with minimal feathering. Additionally, there is a need for phase change inks that exhibit minimal intercolor bleed when two inks of different colors are printed adjacent to each other on a substrate. A need also remains for phase change inks that generate images with high image permanence. In addition, a need remains for phase change inks suitable for ink jet printing processes wherein the substrate is heated prior to printing and is cooled to ambient temperature subsequent to printing (also known as heat and delay printing processes). Further, a need remains for phase change inks that can generate images of desirably high optical density values even when the inks contain relatively low colorant concentrations. Additionally, a need remains for phase change inks that, when printed onto substrates, cause minimized curling of the substrate. There is also a need for phase change inks that exhibit desirable crease resistance. In addition, there is a need for phase change inks that generate images with desirably high transparency and projection efficiency. Further, there is a need for phase change inks wherein the speculate size of spherical ink crystals formed therein during cooling and solidification can be reduced from about 6 to 9 microns to about 2 to 4 microns. Additionally, there is a need for phase change inks wherein the speculate size of spherical ink crystals formed therein during cooling and solidification can be reduced from about 6 to 9 microns to about 1 to 3 micron when the inks further contain crystallinity inhibitors derived from, for example, low viscosity unsaturated aliphatic acid compounds. There is also a need for phase change inks that, when incorporated into an ink jet printer, exhibit controlled jettability. In addition, there is a need for phase change inks that generate images with excellent projection efficiency, with no need for a post fusing step to achieve such efficiency. Further, there is a need for phase change inks that generate images with desirably high waterfastness values. Additionally, there is a need for phase change inks that generate images with desirably high lightfastness values. A need also remains for phase change inks that exhibit desirable viscosity values at hot melt ink printing temperatures. In addition, a need remains for phase change inks comprising ink vehicles in which colorants such as dyes are easily dissolved or dispersed.

SUMMARY OF THE INVENTION

The present invention is directed to a phase change ink composition comprising (a) a nonpolymeric ester compound ink vehicle having a melting point of at least about 60° C.; (b) a conductivity enhancing agent; (c) a colorant; (d) an optional antioxidant, and (e) an optional UV absorber.

DETAILED DESCRIPTION OF THE INVENTION

The inks of the present invention contain an ester compound ink vehicle. The ink vehicle preferably is nonpolymeric. Examples of suitable ink vehicles include (a) sugar esters, such as (1) β-ribo furanose 1,2,3,5-tetraacetate (mp=82° C.; Aldrich 15,902-6), (2) 1-thio-β-gluocose tetraacetate (mp=116° C.; Aldrich 10,447-7), (3) β-ribo furanose 1-acetate 2,3,5-tribenzoate (mp=129° C.; Aldrich 15,901-8), (4) β-ribo pyranose 1,2,3,4-tetra acetate (mp=111° C.; Aldrich 85,503-0), (5) methyl-α-mannopyranoside 2,3,4,6-tetra acetate (mp=66° C.; Aldrich 36,168-2), (6) α-glucose pentaacetate (mp=110° C.; Aldrich G,235-4), (7) β-glucose pentaacetate (mp=131° C.; Aldrich 28,594-3), (8) sorbitol hexaacetate (mp=102° C.; Aldrich 14,608-0), (9) sucrose octaacetate (mp=88° C.; Aldrich 25,260-3), (10) pentaerythritol tetraacetate (mp=80° C.; #P0757, available from TCI America), and the like; (b) amino acid esters, such as (1) N-benzoyl threonine methyl ester (mp=98° C.; Aldrich 28,110-7), (2) N-benzoyl tyrosine ethyl ester (mp=119° C.; Aldrich 85,658-4), (3) N-(tert-butoxy carbonyl)aspartic acid 4-benzyl ester (Aldrich 44,065-5), (4) N-oleoyl tryptophan ethyl ester (mp=77° C.; Aldrich 38,989-7), (5) N-α-methoxycarbonyl tryptophan methyl ester (mp=100° C.; Aldrich 36,706-0), (6) N-(2,4-dinitrophenyl)alanine methyl ester (mp=75° C.; Aldrich 37,201-3), (7) N-acetyl tryptophan ethyl ester (mp=113° C.; Aldrich 85,772-6), (8) N-acetyl tyrosine ethyl ester monohydrate (mp=81° C.; Aldrich A2,290-4, (9) N-(tert-butoxy carbonyl)leucine N-hydroxysuccinimide ester (mp=112° C.; Aldrich 44,533-9), (10) N-(4-nitrobenzoyl)glutamic acid diethyl ester (mp=93° C.; Aldrich 22,110-4), and the like; (c) cholesteryl esters, such as (1) cholesteryl acetate (Aldrich 15,111-4), (2) cholesteryl caprylate (mp=110° C.; Aldrich 12,525-3), (3) cholesteryl chloroformate (mp=116° C.; Aldrich C7,700-7), (4) cholesteryl heptylate (mp=112° C.; Aldrich C7,780-5), (5) cholesteryl hydro cinnamate (mp=110° C.; Aldrich C7,790-2), (6) cholesteryl palmitate (mp=83° C.; Aldrich C7,860-7), (7) cholesteryl pelargonate (mp=92° C.; Aldrich C7,880-1), (8) cholesteryl stearate (mp=92° C.; Aldrich C7,940-9), and the like; (d) carboxylic esters, such as (1) tetraethyl-1,1,2,2-ethanetetracarboxylate (mp=76° C.; Aldrich 13,188-1), (2) methyl 3-isoquinoline carboxylate (mp=87° C.; Aldrich 33,855-9), (3) methyl-4,6-dimethyl-2-oxo-2H-pyran-5-carboxylate (mp=69° C.; Aldrich 19,034-9), (4) methyl indole-4-carboxylate (mp=70° C.; Aldrich 27,388-0), (5) methyl-2-oxo-2H-pyran-5-carboxylate (mp=66° C.; Aldrich 26,143-2), (6) methyl(2-chloro-1-methylethylidene) hydrazine carboxylate (mp=81° C.; Aldrich 37,015-0), (7) methyl 4-allyl-3,5-dioxo-1-cyclohexane carboxylate (mp=130° C.; Aldrich 29,293-1), (8) dimethyl-2-thioxo-1,3-dithiole-4,5-dicarboxylate (mp=88° C.; Aldrich 44,077-9), (9) dimethyl(4-nitrobenzyl)malonate (mp=85° C.; Aldrich 33,308-5), (10) diethyl-2,6-dimethyl-3,5-pyridine dicarboxylate (mp=73° C.; Aldrich 12,025-1), (11) diethyl-4-ethyl-1,4-dihydro-2,6-dimethyl-3,5-pyridine dicarboxylate (mp=107° C.; Aldrich 41,703-3), (12) bis(2-hydroxyethyl) terephthalate (Aldrich 46,515-1), and the like; (e) unsaturated esters, such as (1) methyl-2-chloro-α-cyanocinnamate (mp=109° C.; Aldrich 40,257-5), (2) pentaerythritol tetrakis (3,5-ditert-butyl-4-hydroxyhydro cinnamate) (mp=116° C.; Aldrich 44,178-3), (3) methyl-3-aminocrotonate (mp=82° C.; Aldrich 12,971-2), and the like; (f) alcohol esters, such as (1) 1,2,3-propanetriol tris(hexa decanoate) (mp=67° C.; Aldrich 23,471-0), (2) ascorbic acid 6-palmitate (mp=116° C.; Aldrich 29,288-5), (3) triethylene glycol di-p-tosylate (Aldrich 33,903-2), (4) 1,3-propanediol di-p-tosylate (mp=91° C.; Aldrich 31,755-1), (5) phenyl-1-hydroxy-2-naphthoate (mp=95° C.; Aldrich 38,743-6), (6) methyl diphenylglycolate (mp=75° C.; Aldrich 10,788-3), and the like; (g) benzoate esters, such as (1) methyl-4-acetoxy benzoate (Aldrich 36,379-0), (2) ethyl 3-hydroxybenzoate (mp=73° C.; Aldrich 25,120-8), (3) methyl-2-bromo-5-nitro-benzoate (mp=80° C.; Aldrich 30,021-7), (4) methyl-3,5-dichloro-4-hydroxy benzoate hydrate (mp=124° C.; Aldrich 38,909-9), (5) methyl-3,5-dinitrobenzoate (mp=108° C.; Aldrich 38,636-7), (6) methyl-2,5-dihydroxy benzoate (mp=87° C.; Aldrich 42, 609-1), (7) methyl-2,6-dihydroxy-4-methyl benzoate (mp=97° C.; Aldrich 26, 509-8), (8)

methyl-3,5-dibromo-4-methyl benzoate (mp=89° C.; Aldrich 30,105-1), (9) methyl-3,5-dibromo-4-hydroxy benzoate (mp=124° C.; Aldrich 41,198-1), (10) 4-(2,3-epoxyhexyloxy)phenyl 4-(decyloxy)benzoate (Aldrich 32,853-7), (11) 1,3-propanediol bis(4-amino benzoate) (mp=125° C.; Aldrich 42,656-3), (12) pentaerythritol tetrabenzoate (mp=103° C.; Aldrich 36,937-3), (13) methyl-3,5-dibromo anthranilate (mp=90° C.; Aldrich 29,780-1), and the like; (h) acetate esters, such as (1) vanillin acetate (mp=78° C.; Aldrich 25,860-1), (2) α-(trichloro methyl) benzyl acetate (mp=89° C.; Aldrich 29,126-9), (3) phenacyl-4-(bromomethyl)phenyl acetate (mp=89° C.; Aldrich 31,754-3), (4) 4-nitrophenyl acetate (mp=78° C.; Aldrich N1,990-7), (5) 4-nitrophenyl trimethyl acetate (mp=93° C.; Aldrich 13,504-6), (6) methyl-3,5-dihydroxy phenyl acetate (mp=110° C.; Aldrich 40,582-5), (7) methyl-2-acrylamido-2-methoxy acetate (mp=74° C.; Aldrich 30,268-6), (8) hydroquinone diacetate (Aldrich 27,625-1), (9) 5-nitro-2-furaldehyde diacetate (mp=91° C., Aldrich 14,927-6), (10) 1,4-dihydro-1,4-methanonaphthalene-5,8-diol diacetate (mp=107° C.; Aldrich 43,202-4), (11) 1,2,4-phenenyl triacetate (mp=99° C.; Aldrich 13,203-9), and the like; as well as mixtures thereof.

The ink vehicle is present in the ink in any desired or effective amount, typically at least about 40 percent by weight of the ink, and preferably at least about 60 percent by weight of the ink, and typically no more than about 90 percent by weight of the ink, and preferably no more than about 80 percent by weight of the ink, although the amount can be outside of these ranges.

The inks of the present invention also contain a conductivity enhancing agent. The conductivity enhancing agent preferably is nonpolymeric. Examples of suitable conductivity enhancing agents include (1) diethyl-(4-aminobenzyl) phosphonate (Aldrich 33,847-8), (2) diethyl-(phthalimidomethyl)phosphonate (Aldrich 36,622-6), (3) diethyl-(2,2,2-trifluoro-1-hydroxyethyl)phosphonate (Aldrich 43,982-7), (4) diphenyl succinimidyl phosphate (Aldrich 45,061-8), (5) dihexadecyl phosphate (Aldrich 27,149-7), (6) undecylenic acid zinc salt (hardness value 68; Aldrich 32,958-4), (7) zinc bis(2,2,6,6-tetramethyl-3,5-heptanedionate) (Aldrich 41,773-4), (8) zinc cyclohexanebutyrate (Aldrich 22,841-9), (9) zinc stearate (Aldrich 30,756-4), and the like, as well as mixtures thereof.

The conductivity enhancing agent is present in the ink in any desired or effective amount, typically at least about 20 percent by weight of the ink, and preferably at least about 30 percent by weight of the ink, and typically no more than about 45 percent by weight of the ink, and preferably no more than about 40 percent by weight of the ink, although the amount can be outside of these ranges.

The inks of the present invention also contain a colorant. Any desired or effective colorant can be employed in the inks of the present invention, including dyes, pigments, mixtures thereof, and the like, provided that the colorant can be dissolved or dispersed in the ink vehicle, with spirit soluble dyes being preferred. The colorant is present in the ink in any desired or effective amount to obtain the desired color and hue, typically at least about 1 percent by weight of the ink, and preferably at least about 5 percent by weight of the ink, and typically no more than about 15 percent by weight of the ink, and preferably no more than about 10 percent by weight of the ink, although the amount can be outside of these ranges.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich); Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C. Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI), Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 (C.I. Solvent Black, C.I. 12195) (BASF), Sudan Blue 670 (C.I. 61554) (BASF), Sudan Yellow 146 (C.I. 12700) (BASF), and Sudan Red 462 (C.I. 26050) (BASF) are preferred.

Optionally, the inks of the present invention can also contain an antioxidant. The optional antioxidants in the inks protect the images from oxidation and also protect the ink components from oxidation during the heating portion of the ink preparation process. Specific examples of suitable antioxidants include (1) 2,2'-methylenebis(6-tert-butyl-4-methyl-phenol) (mp=125° C.; Aldrich 41,313-5), (2) 2,2'-methylenebis(6-tert-butyl-4-ethyl-phenol) (mp=120° C.; Aldrich 41,314-3), (3) 2,6-di-tert-butyl-4-methoxyphenol (mp=105° C.; Aldrich 25,106-2), (4) 2,4-di-tert-butyl-6-(4-methoxybenzyl)phenol (mp=85° C.; Aldrich 23,008-1), (5) 2,6-di-tert-butyl-4-(dimethylaminomethyl)phenol (mp=93° C.; Aldrich 41,327-5), (6) 4-dodecylresorcinol (mp=80° C.; Aldrich D22,260-7), (7) 3-(3,5-di-tert-butyl-4-hydroxyphenyl)propionate (Ultranox 276, available from General Electric Company), (8) tetrakis (2,4-di-tert-butyl phenyl)-4,4'-biphenyl diphosphonite (Aldrich 46,852-5), and the like, as well as mixtures thereof.

The optional antioxidant, when present, is present in the ink in any desired or effective amount, typically at least about 1 percent by weight of the ink, and preferably at least about 3 percent by weight of the ink, and typically no more than about 10 percent by weight of the ink, and preferably no more than about 5 percent by weight of the ink, although the amount can be outside of these ranges.

The inks of the present invention can also optionally contain a UV absorber. The optional UV absorbers primarily protect the images generated therewith from UV degradation. Specific examples of suitable UV absorbers include (1) 2,4'-dibromoacetophenone (mp=109° C.; Aldrich D3,830-8), (2) 4'-morpholinoacetophenone (mp=99° C.; Aldrich 11,986-5), (3) 4'-(methylthio)acetophenone (mp=81° C.; Aldrich 39,658-3), (4) 3',5'-dichloro-2'-hydroxyacetophenone (mp=96° C.; Aldrich 38,339-2), (5) 2',4'-dihydroxypropiophenone (mp=97° C.; Aldrich D11, 920-2), (6) 2',5'-dihydroxypropiophenone (mp=97° C.; Aldrich D11,922-9), (7) 2,4'-dibromopropiophenone (mp=87° C.; Aldrich 38,341-4), (8) 2,2'-dihydroxybenzophenone (mp=62° C.; Aldrich D1,020-5), (9) 3,4-diaminobenzophenone (mp=116° C.; Aldrich 19,176-0), (10) 4,5-dihydro-6-methyl-3(2H)-pyridazinone monohydrate (mp=83° C.; Aldrich 27,820-3), (11) 2,6-di-tert-butyl-1,4-benzoquinone (mp=66° C.; Aldrich 15,393-1), (12) 3,5-di-tert-butyl-1,2-benzoquinone (mp=114° C.; Aldrich 15,745-7), (13) 2-(2H-benzotriazol-2-yl)-4,6-ditert-pentyl phenol (mp=82° C.; Aldrich 42,274-6), (14) 2-(2H-benzotriazol-2-yl)-4-(1,1,3,3-tetramethylbutyl)phenol (mp= 107° C.; Aldrich 32,280-6), (15) 2(3-(2H-benzotriazol-2-yl)-4-hydroxyphenyl)ethylmethacrylate (mp=97° C., Aldrich 41,343-76), and the like, as well as mixtures thereof.

When present, the optional UV absorber is present in the ink in any desired or effective amount, typically at least about 1 percent by weight of the ink, and preferably at least about 3 percent by weight of the ink, and typically no more than about 10 percent by weight of the ink, and preferably no more than about 5 percent by weight of the ink, although the amount can be outside of these ranges.

The ink vehicle and conductivity enhancing agent in the phase change inks of the present invention preferably are crystalline or semicrystalline in the solid state. A material is considered crystalline when it comprises crystals with a regular arrangement of its atoms in the space lattice. When this arrangement of atoms in the space lattice is irregular, the material is considered amorphous. The state of part of the structure being crystalline and another part amorphous is referred to as semicrystalline. When solidified on a print substrate such as paper or transparency, the phase change inks can crystallize in a spherulitic morphology. Preferably, the size of the spherules is no more than about 10 microns, and more preferably no more than about 4 microns, for optimum projection efficiency, although the spherulite size can be outside of these ranges. The ink opacity increases with the size of the spherulites. The spherulite size can be measured by an optical microscope with cross polarized light or by the low angle solid state light scattering method (R. S. Stein and M. B. Rhodes, *J. Appl. Phys.*, 31, 1873 (1960), the disclosure of which is totally incorporated herein by reference). The latter provides an average size from the sample. A monochromatic, vertically polarized light is passed through the sample. The scattered light is analyzed with another nicol prism, with its optic axis horizontal. This process is conventionally known as the $H_v$ scattering method. The spherulite size is measured from the location of the maximum intensity in the four-leaf clover scattering pattern. Large spherulites of a size greater than about 5 microns, might result in brittle prints. The blended components of the ink, when solidified, form a dispersed phase of small spherulitic crystalline domains in the matrix of each other. This morphology of reduced spherulitic size, typically reduced from a range of about 6 to 9 microns to a range of about 0.5 to 3 microns, and preferably to a range of about 0.5 to 1 micron, as measured with an optical microscope, not only improves the projection efficiency, but also increases the crease resistance. Inks with a spherulite size of from about 0.5 to 1 micron are ideal, since they scatter minimal light, thereby improving projection efficiency when printed on transparencies. The resistance to creasing is also increased with reduced spherulite size because of better intramolecular bonding of the ink molecules.

The inks of the present invention can be prepared by any suitable method, such as by simple mixing of the ink components, followed by heating to a temperature of, for example, about 140° C. and stirring for, for example, about 60 minutes until a homogeneous solution has formed, followed by cooling to about 25° C.

The ink compositions of the present invention typically have melting points no lower than about 60° C., and preferably no lower than about 90° C., and typically have melting points no higher than about 150° C., and preferably no higher than about 120° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 25 centipoise, preferably no more than about 20 centipoise, and even more preferably no more than about 10 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

Hardness is a property of solids and plastics that is defined by their solidity and firmness as measured by their resistance to indentation by an indenter of fixed shape and size under a static load. The hardness of images can be measured with a Digital-Pencil style Durometer, Model 211 B-00 PTC, obtained from Pacific Transducer Corporation, using ASTM Standard specifications for resistance to penetration with a conical (30 degrees included angle) indenter and applying a 1 kilogram load. The hardness range for materials as measured with this instrument is from about 1 to about 100, the latter being the highest measurable value. It is believed that the images generated with the inks of the present invention, after cooling to ambient temperature (typically from about 20 to about 25° C., although ambient temperature can be outside of this range) will exhibit hardness values of at least about 70 or more, and in some embodiments will exhibit hardness values of about 75 or about 80.

The inks of the present invention typically undergo, upon heating, a change from a solid state to a liquid state in a period of less than about 100 milliseconds, preferably less than about 50 milliseconds, and more preferably less than about 10 milliseconds, although the time can be outside of these ranges. There is no necessary lower limit on this period of time for the inks; it is believed that practically achievable lower limits are around 5 milliseconds, although, if practically achievable, lower periods of time are acceptable.

The inks of the present invention typically exhibit acoustic loss values of no more than about 100 decibels per millimeter, preferably no more than about 60 decibels per millimeter, and more preferably no more than about 40 decibels per millimeter, although the acoustic loss value can be outside of these ranges. There is no necessary lower limit on acoustic loss value for the inks; it is believed that practically achievable lower limits are around 10 decibels per millimeter, although, if practically achievable, lower acoustic loss values are acceptable. Acoustic loss can be measured by placing a sample of the material to be measured between two transducers with the temperature set at about 150° C. The samples are allowed to equilibrate at 150° C. for five minutes. The two transducers are then brought together to maximize the acoustic signal. The amplitude and the position of the signals are recorded. The two transducers are then separated by a distance varying from about 25.4 microns to about 125.4 microns, recording each time the amplitude and the position of the signal. Preferably, each measurement is performed three times, and three samples of the same material are measured. The attenuation decibels per millimeter is then calculated by ratioing the amplitude values obtained at different separation distances.

The inks of the present invention typically exhibit a conductivity of no less than about 2 log(picomho/cm), preferably no less than about 6 log(picomho/cm), and more preferably no less than about 6.5 log(picomho/cm), and even more preferably no less than about 7 log(picomho/cm), although the conductivity can be outside of these ranges. While there is no upper limit on conductivity, typical conductivity values generally do not exceed about 9 log (picomho/cm). Conductivity can be measured under melt conditions (typically at about 150° C.) by placing an aluminum electrode in the molten ink and reading the resistivity output on a GenRad 1689 precision RLC. Digibridge at a frequency of 1 kilohertz. The conductivity of the material is measured in terms of the reciprocal of resistivity, which is the capacity for electrical resistance.

The inks of the present invention exhibit substantial transparency. The images generated with the inks typically exhibit haze values of no more than about 25, preferably no more than about 15, and more preferably no more than about 10, although the haze value can be outside of these ranges. There is no required lower limit on haze values. Haze values can be measured on images printed with the ink on uncoated polyester, such as MYLAR®, with a Haze meter XL-211, HAZEGARD® System obtained from Pacific Scientific Company.

The inks of the present invention generate images with desirable crease resistance. The images generated with the inks typically exhibit crease values of no more than about 0.6 millimeters, preferably no more than about 0.2 millimeters, and more preferably no more than about 0.1 millimeters, although the crease value can be outside of these ranges. There is no lower limit on crease values; ideally, this value is zero. The average width of the creased image can be measured by printing an image on paper, followed by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer. The crease value can also be reported in terms of area, especially when the image is sufficiently hard to break unevenly on creasing. Measured in terms of area, crease values of 60 millimeters correspond to about 0.6, crease values of 40 millimeters correspond to about 0.4, crease values of 10 millimeters correspond to about 0.1, and the like.

Any suitable print substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The inks of the present invention are particularly suitable for printing processes wherein the print substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances.

The present invention is also directed to a process which entails incorporating an ink of the present invention into an ink jet printing apparatus, melting the ink, and causing droplets of the melted ink to be ejected in an imagewise pattern onto a print substrate. In one preferred embodiment, the printing apparatus employs an acoustic ink jet process, wherein droplets of the ink are caused to be ejected in imagewise pattern by acoustic beams. In a particularly preferred embodiment, the printing apparatus employs an acoustic ink jet printing process wherein droplets of the ink are formed by acoustic beams without imparting a substantial velocity component toward the print substrate, using a droplet forming force that is sufficient only to form the ink droplets, and the printing process further comprises generating an electric field to exert an electrical force different from the droplet forming force on the ink droplets to move the ink droplets toward the print substrate, and controlling the electrical force exerted on the formed complete ink droplets by the electric field. The inks of the present invention are also suitable for piezoelectric ink jet printing processes, wherein the printing process entails incorporating the ink into an ink jet printing apparatus, melting the ink, and causing droplets of the melted ink to be ejected in an imagewise pattern onto a print substrate, wherein the printing apparatus employs a piezoelectric ink jet process, wherein droplets of the ink are caused to be ejected in imagewise pattern by oscillations of piezoelectric vibrating elements.

Specific embodiments of the invention will now be described in detail. These examples are intended to be illustrative, and the invention is not limited to the materials, conditions, or process parameters set forth in these embodiments. All parts and percentages are by weight unless otherwise indicated.

Acoustic loss measurements in the Examples were measured by placing samples of the materials between the two transducers with the temperature set at 150° C. The samples were allowed to equilibrate at 150° C. for five minutes. The two transducers were then brought together to maximize the acoustic signal. The amplitude and the position of the signals were recorded. The two transducers were then separated by a distance varying from 25.4 microns to 125.4 microns, recording each time the amplitude and the position of the signal. Each measurement was performed three times, and three samples of each material were measured. The attenuation decibels per millimeter was then calculated by ratioing the amplitude values obtained at different separation distances.

Optical density values in the Examples were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numeric keyboard for selection of operating parameters and the entry of tristimulus values, and an alphanumeric keyboard for entry of product standard information.

Viscosity values in the Examples were measured at 150° C. with a Stress Rheometer, obtained from Cari-Med, Model CSL 100. All experiments were performed at a shear rate of 1,250 s$^{-1}$.

Crease values in the Examples were measured on solid area images printed on paper by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer.

Haze values in the Examples were measured on images printed on uncoated polyester (such as MYLAR®) with a Haze meter XL-211, HAZEGARD® System, obtained from Pacific Scientific Company.

The hardness values in the Examples were measured with a Digital-Pencil style Durometer, Model 211B-00 PTC., obtained from Pacific Transducer Corporation, using ASTM Standard specifications for resistance to penetration with a conical (30 degrees included angle) indenter and applying a 1 kilogram load. The hardness range for materials as measured with this instrument is from about 1 to about 100, the latter being the highest measurable value.

Conductivity values in the Examples were measured under melt conditions at 150° C. by placing an aluminum electrode in the melt and reading the resistivity output on a GenRad 1689 precision RLC Digibridge at a frequency of 1 kilohertz. Conductivity was calculated from the resistivity data.

The gloss values in the Examples were obtained on a 75° Glossmeter, Glossgard II, obtained from Pacific Scientific (Gardner/Neotec Instrument Division).

The spherulite sizes in the Examples were measured with an optical microscope with cross polarized light.

Lightfast values in the Examples were measured in a Mark V Lightfast Tester, obtained from Microscal Company, London, England.

Waterfast values in the Examples were obtained from the optical density data recorded before and after washing the images with water at 25° C. for five minutes.

EXAMPLE I

A black phase change ink was prepared by mixing 50 percent by weight pentaerythritol tetrakis(3,5-di-tert-butyl-4-hydroxy hydrocinnamate (ink vehicle; Aldrich 36,937-3; melting point 116° C.; hardness value 88; acoustic loss value 25 decibels per millimeter), 40 percent by weight diethyl (4-aminobenzyl)phosphonate (conductivity enhancing agent; Aldrich 33,847-8; melting point 94° C.; acoustic loss value 39 decibels per millimeter; conductivity 6.9 log (picomho/cm)), 5 percent by weight octadecyl 3-(3,5-di-tert-butyl-4-hydroxyphenyl)propionate (antioxidant; Ultranox 276, obtained from General Electric Company), and 5 percent by weight Neozapon Black X51 dye (C.I. Solvent Black; C.I. 12195; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This black ink exhibited an acoustic loss value of 45 decibels per millimeter, a viscosity of 9.5 centipoise at 150° C., and a conductivity of 6.6 log(picomho/cm) at 150° C., and when applied to paper, generated images with a hardness value of 80 at 23° C.

EXAMPLE II

A blue phase change ink was prepared by mixing 50 percent by weight β-D-glucose pentaacetate (ink vehicle; Aldrich 28,594-3; melting point 131° C.; acoustic loss value 46 decibels per millimeter), 40 percent by weight diethyl (phthalimidomethyl)phosphonate (conductivity enhancing agent; Aldrich 36,622-6; melting point 64° C.; acoustic loss value 32 decibels per millimeter; conductivity 6.8 log (picomho/cm)), 5 percent by weight tetrakis(2,4-di-tert-butyl phenyl)-4,4'-biphenyl diphosphonite (antioxidant; Aldrich 46,852-5; hardness value 90), and 5 percent by weight Sudan Blue 670 dye (C.I. 61554; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This blue ink exhibited an acoustic loss value of 50 decibels per millimeter, a viscosity of 9.5 centipoise at 150° C., and a conductivity of 6.5 log(picomho/cm) at 150° C., and when applied to paper, generated images with a hardness value of 77 at 23° C.

EXAMPLE III

A yellow phase change ink was prepared by mixing 50 percent by weight hydroquinone diacetate (ink vehicle; Aldrich 27,625-1; hardness value 70; acoustic loss value 23 decibels per millimeter), 40 percent by weight diphenylsuccinimidyl phosphate (conductivity enhancing agent; Aldrich 45,061-8; melting point 86° C.; acoustic loss value 34 decibels per millimeter; conductivity 7.2 log(picomho/cm)), 5 percent by weight tetrakis(2,4-di-tert-butyl phenyl)-4,4'-biphenyl diphosphonite (antioxidant; Aldrich 46,852-5; hardness value 90), and 5 percent by weight Sudan Yellow 146 dye (C.I. 12700; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This yellow ink exhibited an acoustic loss value of 52 decibels per millimeter, a viscosity of 9.4 centipoise at 150° C., and a conductivity of 6.6 log(picomho/cm) at 150° C., and when applied to paper, generated images with a hardness value of 78 at 23° C.

EXAMPLE IV

A magenta phase change ink was prepared by mixing 50 percent by weight 1,4-dihydro-1,4-methanonaphthalene-5,8-diol diacetate (ink vehicle; Aldrich 43,202-4, melting point 107° C.; acoustic loss value 44 decibels per millimeter), 40 percent by weight undecylenic acid zinc salt (conductivity enhancing agent; Aldrich 32,958-4; hardness value 68; melting point 120° C.; acoustic loss value 49 decibels per millimeter; conductivity 7.5 log(picomho/cm)), 5 percent by weight tetrakis(2,4-di-tert-butyl phenyl)-4,4'-biphenyl diphosphonite (antioxidant; Aldrich 46,852-5; hardness value 90), and 5 percent by weight Sudan Red 462 dye (C.I. 26050; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This red ink exhibited an acoustic loss value of 51 decibels per millimeter, a viscosity of 9,5 centipoise at 150° C., and a conductivity of 6.7 log(picomho/cm) at 150° C., and when applied to paper, generated images with a hardness value of 77 at 23° C.

EXAMPLE V

Each of the inks prepared as described in Examples I through IV was incorporated into an acoustic ink jet printing test fixture utilizing the ejection mechanism disclosed in *J. Appl. Phys.*, 65(9), 1 May 1989, and references therein, the disclosures of each of which are totally incorporated herein by reference. A jetting frequency of 160 MHz was used to generate drops of about 2 picoliters, up to 12 drops per pixel at 600 spi. The images formed on paper exhibited excellent color quality, optical density values of 2.55 (black), 2.05 (cyan), 2.25 (magenta), and 1.58 (yellow), sharp edges, and waterfastness and lightfastness values of greater than 95 percent. The images obtained with these conductive inks on paper were folded and creased. The crease values (measured in terms of area and subsequently converted to millimeters) were 0.08 (black), 0.06 (cyan), 0.06 (magenta), and 0.04 (yellow). The gloss values for the images were 90 (black), 87 (magenta), 84 (cyan), and 86 (yellow). The ink spherulite radius was measured at 1 to 1.5 microns, leading to haze values of 5 (black), 6 (magenta), 5 (cyan), and 4 (yellow) when printed on transparency substrates.

EXAMPLE VI

A black phase change ink was prepared by mixing 50 percent by weight pentaerythritol tetraacetate (ink vehicle; #P0757, obtained from TCI America; melting point 80° C.; hardness value 88; acoustic loss value 25 decibels per millimeter), 40 percent by weight diethyl(4-aminobenzyl) phosphonate (conductivity enhancing agent; Aldrich 33,847-8; melting point 94° C.; acoustic loss value 39 decibels per millimeter; conductivity 6.9 log(picomho/cm)), 5 percent by weight octadecyl-3-(3,5-di-tert-butyl-4-hydroxyphenyl)propionate (antioxidant; Ultranox 276, obtained from General Electric Company), and 5 percent by weight Neozapon Black X51 dye (C.I. Solvent Black; C.I. 12195; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This black ink exhibited an acoustic loss value of 50 decibels per millimeter, a viscosity of 9.5 centipoise at 150° C., and a conductivity of 6.6 log(picomho/cm) at 150° C., and when applied to paper, generated images with a hardness value of 79 at 23° C.

EXAMPLE VII

A blue phase change ink was prepared by mixing 10 percent by weight sucrose octaacetate (ink vehicle; Aldrich 25,260-3; melting point 88° C.; hardness value 90.5), 40 percent by weight methyl-4,6-dimethyl-2-oxo-2H-pyran-5-carboxylate (ink vehicle; Aldrich 19,034-9; melting point 69° C., hardness value 78; acoustic loss value 33 decibels per millimeter), 40 percent by weight diethyl (phthalimidomethyl)phosphonate (conductivity enhancing agent; Aldrich 36,622-6; melting point 64° C.; acoustic loss value 32 decibels per millimeter; conductivity 6.8 log (picomho/cm)), 5 percent by weight tetrakis(2,4-di-tert-butyl phenyl)-4,4'-biphenyl diphosphonite (antioxidant;

Aldrich 46,852-5; hardness value 90), and 5 percent by weight Sudan Blue 670 dye (C.I. 61554; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This blue ink exhibited an acoustic loss value of 58 decibels per millimeter, a viscosity of 10.5 centipoise at 150° C., and a conductivity of 6.4 log(picomho/cm) at 150° C., and when applied to paper, generated images with a hardness value of 79 at 23° C.

EXAMPLE VIII

A yellow phase change ink was prepared by mixing 50 percent by weight methyl-3-isoquinoline carboxylate (ink vehicle; Aldrich 33,855-9; melting point 87° C.; acoustic loss value 44 decibels per millimeter), 40 percent by weight diphenylsuccinimidyl phosphate (conductivity enhancing agent; Aldrich 45,061-8; melting point 86° C.; acoustic loss value 34 decibels per millimeter; conductivity 7.2 log (picomho/cm)), 5 percent by weight tetrakis(2,4-di-tert-butyl phenyl)-4,4'-biphenyl diphosphonite (antioxidant; Aldrich 46,852-5; hardness value 90), and 5 percent by weight Sudan Yellow 146 dye (C.I. 12700; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This yellow ink exhibited an acoustic loss value of 58 decibels per millimeter, a viscosity of 9.6 centipoise at 150° C., and a conductivity of 6.6 log(picomho/cm) at 150° C., and when applied to paper, generated images with a hardness value of 78 at 23° C.

EXAMPLE IX

A magenta phase change ink was prepared by mixing 50 percent by weight bis(2-hydroxyethyl)terephthalate (ink vehicle; Aldrich 46,515-1; melting point 108° C.; hardness value 83.4; acoustic loss value 44 decibels per millimeter), 40 percent by weight undecylenic acid zinc salt (conductivity enhancing agent; Aldrich 32,958-4; hardness value 68; melting point 120° C.; acoustic loss value 49 decibels per millimeter; conductivity 7.5 log(picomho/cm)), 5 percent by weight tetrakis (2,4-di-tert-butyl phenyl)-4,4'-biphenyl diphosphonite (antioxidant; Aldrich 46,852-5; hardness value 90), and 5 percent by weight Sudan Red 462 dye (C.I. 26050; obtained from BASF). This mixture was then diluted with methyl ethyl ketone (for 10 grams of the solid ink mixture the amount of solvent was 20 grams). The resulting slurry was then heated to a temperature of 100° C. with constant stirring to impart color to the ink. After 30 minutes, the temperature was raised to 140° C. and stirred for a period of 60 minutes until a homogeneous solution formed. During this period, the ink became free of the solvent, which was recycled. Subsequently the mixture was cooled to 25° C. This red ink exhibited an acoustic loss value of 60 decibels per millimeter, a viscosity of 9.7 centipoise at 150° C., and a conductivity of 6.65 log(picomho/cm) at 150° C., and when applied to paper, generated images with a hardness value of 78 at 23° C.

EXAMPLE X

Each of the inks prepared as described in Examples VI through IX was incorporated into an acoustic ink jet printing test fixture and tested as described in Example V. The images formed on paper exhibited excellent color quality, optical density values of 2.69 (black), 2.21 (cyan), 2.30 (magenta), and 1.70 (yellow), sharp edges, and lightfastness and waterfastness values of greater than 95 percent. The images obtained with these conductive inks on paper were folded and creased. The crease values (measured in terms of area and subsequently converted to millimeters) were 0.06 (black), 0.08(cyan), 0.07 (magenta), and 0.05 (yellow). The gloss values for the images were 90 (black), 85 (magenta), 83 (cyan), and 85 (yellow). The ink spherulite radius was measured at 1 to 1.5 microns, leading to haze values of 6 (black), 5 (magenta), 6 (cyan), and 6 (yellow) when printed on transparency substrates.

Other embodiments and modifications of the present invention may occur to those of ordinary skill in the art subsequent to a review of the information presented herein, these embodiments and modifications, as well as equivalents thereof, are also included within the scope of this invention.

What is claimed is:

1. A phase change ink composition comprising (a) a nonpolymeric ester compound ink vehicle having a melting point of at least about 60° C., wherein the ink vehicle is a sugar ester, an amino acid ester, a cholesteryl ester, a carboxylic ester, an unsaturated ester, an alcohol ester, a benzoate ester, an acetate ester, or a mixture thereof; (b) a conductivity enhancing agent; (c) a colorant; (d) an optional antioxidant, and (e) an optional UV absorber.

2. An ink composition according to claim 1 wherein the ink vehicle is β-ribo furanose 1,2,3,5-tetroacetate, 1-thio-β-gluocose tetraacetate, β-ribo furanose 1-acetate 2,3,5-tribenzoate, β-ribo pyranose 1,2,3,4-tetra acetate, methyl-α-mannopyranoside 2,3,4,6-tetra acetate, α-glucose pentaacetate, β-glucose pentaacetate, sorbitol hexaacetate, sucrose octaacetate, pentaerythritol tetraacetate, N-benzoyl threonine methyl ester, N-benzoyl tyrosine ethyl ester, N-(tert-butoxy carbonyl)aspartic acid 4-benzyl ester, N-oleoyl tryptophan ethyl ester, N-α-methoxycarbonyl tryptophan methyl ester, N-(2,4-dinitrophenyl)alanine methyl ester, N-acetyl tryptophan ethyl ester, N-acetyl tyrosine ethyl ester monohydrate, N-(tert-butoxy carbonyl)leucine N-hydroxysuccinimide ester, N-(4-nitrobenzoyl)glutamic acid diethyl ester, cholesteryl acetate, cholesteryl caprylate, cholesteryl chloroformate, cholesteryl heptylate, cholesteryl hydro cinnamate, cholesteryl palmitate, cholesteryl pelargonate, cholesteryl stearate, tetraethyl-1,1,2,2-ethanetetracarboxylate, methyl 3-isoquinoline carboxylate, methyl-4,6-dimethyl-2-oxo-2H-pyran-5-carboxylate, methyl indole-4-carboxylate, methyl-2-oxo-2H-pyran-5-carboxylate, methyl(2-chloro-1-methylethylidene)hydrazine carboxylate, methyl 4-allyl-3,5-dioxo-1-cyclohexane carboxylate, dimethyl-2-thioxo-1,3-dithiole-4,5-dicarboxylate, dimethyl(4-nitrobenzyl)malonate, diethyl-2,6-dimethyl-3,5-pyridine dicarboxylate, diethyl-4-ethyl-1,4-dihydro-2,6-dimethyl-3,5-pyridine dicarboxylate, bis(2-hydroxyethyl)terephthalate, methyl-2-chloro-α-cyanocinnamate, pentaerythritol tetrakis(3,5-ditert-butyl-4-hydroxyhydro cinnamate), methyl-3-aminocrotonate, 1,2,3-propanetriol tris(hexa decanoate), ascorbic acid 6-palmitate, triethylene glycol di-p-tosylate, 1,3-propanediol di-p-tosylate, phenyl-1-hydroxy-2-naphthoate, methyl diphenylglycolate, methyl-4-acetoxy benzoate, ethyl 3-hydroxybenzoate, methyl-2-bromo-5-nitro-benzoate, methyl-3,5-dichloro-4-hydroxy benzoate hydrate, methyl-3,5-dinitrobenzoate, methyl-2,5-dihydroxy benzoate, methyl-2,6-dihydroxy-4-methyl benzoate, methyl-3,5-dibromo-4-methyl benzoate, methyl-3,5-dibromo-4-hydroxy benzoate, 4-(2,3-epoxyhexyloxy)phenyl 4-(decyloxy)benzoate, 1,3-propanediol bis(4-amino benzoate), pentaerythritol tetrabenzoate, methyl-3,5-dibromo anthranilate, vanillin acetate, α-(trichloro methyl)benzyl acetate, phenacyl-4-(bromomethyl)phenyl acetate, 4-nitrophenyl acetate, 4-nitrophenyl trimethyl acetate, methyl-3,5-dihydroxy phenyl acetate, methyl-2-acrylamido-2-methoxy acetate, hydroquinone diacetate, 5-nitro-2-furaldehyde diacetate, 1,4-dihydro-1,4-methanonaphthalene-5,8-diol diacetate, 1,2,4-phenenyl triacetate, or mixtures thereof.

3. An ink composition according to claim 1 wherein the ink vehicle is present in the ink in an amount of at least about 40 percent by weight of the ink, and wherein the ink vehicle is present in the ink in an amount of no more than about 90 percent by weight of the ink.

4. An ink composition according to claim 1 wherein the conductivity enhancing agent is diethyl-(4-aminobenzyl) phosphonate, diethyl-(phthalimidomethyl)phosphonate, diethyl-(2,2,2-trifluoro-1-hydroxyethyl)phosphonate, diphenyl succinimidyl phosphate, dihexadecyl phosphate, undecylenic acid zinc salt, zinc bis(2,2,6,6-tetramethyl-3,5-heptanedionate), zinc cyclohexanebutyrate, zinc stearate, or mixtures thereof.

5. An ink composition according to claim 1 wherein the conductivity enhancing agent is present in the ink in an amount of at least about 20 percent by weight of the ink, and wherein the conductivity enhancing agent is present in the ink in an amount of no more than about 45 percent by weight of the ink.

6. An ink composition according to claim 1 wherein the colorant is a pigment.

7. An ink composition according to claim 1 wherein the colorant is a dye.

8. An ink composition according to claim 1 wherein the colorant is present in the ink in an amount of at least about 1 percent by weight of the ink, and wherein the colorant is present in the ink in an amount of no more than about 15 percent by weight of the ink.

9. An ink composition according to claim 1 containing an antioxidant, wherein the antioxidant is present in the ink in an amount of at least about 1 percent by weight of the ink, and wherein the antioxidant is present in the ink in an amount of no more than about 10 percent by weight of the ink.

10. An ink composition according to claim 1 containing a UV absorber, wherein the UV absorber is present in the ink in an amount of at least about 1 percent by weight of the ink, and wherein the UV absorber is present in the ink in an amount of no more than about 10 percent by weight of the ink.

11. An ink composition according to claim 1 wherein the ink has a haze value of no more than about 25.

12. An ink composition according to claim 1 wherein the ink has a hardness value of at least about 70 at temperatures of from about 20 to about 25° C.

13. An ink composition according to claim 1 wherein the ink has a melting point of no lower than about 60° C., and wherein the ink has a melting point of no higher than about 150° C.

14. An ink composition according to claim 1 wherein at ink jetting temperatures the ink has a melt viscosity of no more than about 25 centipoise.

15. A process which comprises incorporating into an ink jet printing apparatus an ink composition according to claim 1, melting the ink, and causing droplets of the melted ink to be ejected in an imagewise pattern onto a print substrate.

16. A process according to claim 15 wherein the printing apparatus employs an acoustic ink jet process, wherein droplets of the ink are caused to be ejected in imagewise pattern by acoustic beams.

17. A process according to claim 15 wherein the printing apparatus employs an acoustic ink jet printing process wherein droplets of the ink are formed by acoustic beams without imparting a substantial velocity component toward the print substrate, using a droplet forming force that is sufficient only to form the ink droplets, and wherein the printing process further comprises generating an electric field to exert an electrical force different from the droplet forming force on the ink droplets to move the ink droplets toward the print substrate, and controlling the electrical force exerted on the formed complete ink droplets by the electric field.

18. A process according to claim 15 wherein the printing apparatus employs a piezoelectric ink jet process, wherein droplets of the ink are caused to be ejected in imagewise pattern by oscillations of piezoelectric vibrating elements.

19. A process according to claim 15 wherein the print substrate is heated during the printing process.

* * * * *